Aug. 26, 1969   B. C. GOUGH   3,463,502
GARBAGE CAN CART WITH REMOVABLE SNOW SKI
Filed April 19, 1967   2 Sheets-Sheet 1

Boyd C. Gough
INVENTOR.

Aug. 26, 1969   B. C. GOUGH   3,463,502
GARBAGE CAN CART WITH REMOVABLE SNOW SKI
Filed April 19, 1967   2 Sheets-Sheet 2

Boyd C. Gough
INVENTOR.

United States Patent Office 3,463,502
Patented Aug. 26, 1969

3,463,502
GARBAGE CAN CART WITH REMOVABLE SNOW SKI
Boyd C. Gough, 4731 S. 2nd W., Murray, Utah 84107
Filed Apr. 19, 1967, Ser. No. 632,014
Int. Cl. B62b *19/00, 13/18, 1/12*
U.S. Cl. 280—8                     7 Claims

ABSTRACT OF THE DISCLOSURE

An elongated cart having handle means at one end and single transverse axle means intermediate its opposite ends provided with opposite end ground engaging wheels, the cart being adapted to support a plurality of upright trash or garbage cans thereon and including a skid plate attachment readily removably engageable with the undersurface portions of the cart adapted to form a substantially planar ski surface beneath the entire cart so as to enable the cart to be readily moved over ground which is covered by snow, the ground engaging wheels of the cart projecting only slightly below the planar ski surface of the attachment when the latter is secured to the cart.

---

The cart of the instant invention is constructed primarily of formed tubular material although other suitable materials may be used and the tubular material of which the cart is constructed is preferably aluminum tubing so that the cart will be light and thus easy to handle and the portions thereof formed of such aluminum tubing will be weather resistant.

The cart is elongated in configuration and adapted to support thereon a plurality of garbage or trash cans spaced longitudinally therealong. By positioning a plurality of garbage cans on the cart in positions spaced longitudinally of the cart, the maximum width of the cart is maintained at a minimum thereby enabling it to be readily moved through narrow gate openings and other narrow passageways.

The cart is provided with a removable snow ski attachment underlying substantially all under surface portions of the cart except for the ground engaging wheels of the cart which project only slightly below the snow ski attachment when the latter is secured to the cart and therfore the cart may be readily moved over ground surfaces upon which snow has fallen.

The main object of this invention is to provide a cart upon which a plurality of garbage cans or trash cans may be placed and readily moved from one location to another.

Another object of this invention, in accordance with the preceding object, is to provide a cart including a snow ski attachment therefor adapting the cart to be readily pushed over snow covered ground surfaces.

A final object of this invention to be specifically enumerated herein is to provide a cart in accordance with the preceding objects which will conform to conventional forms of manufacture, be of simple construction and easy to use so as to provide a device that will be economically feasible, long-lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
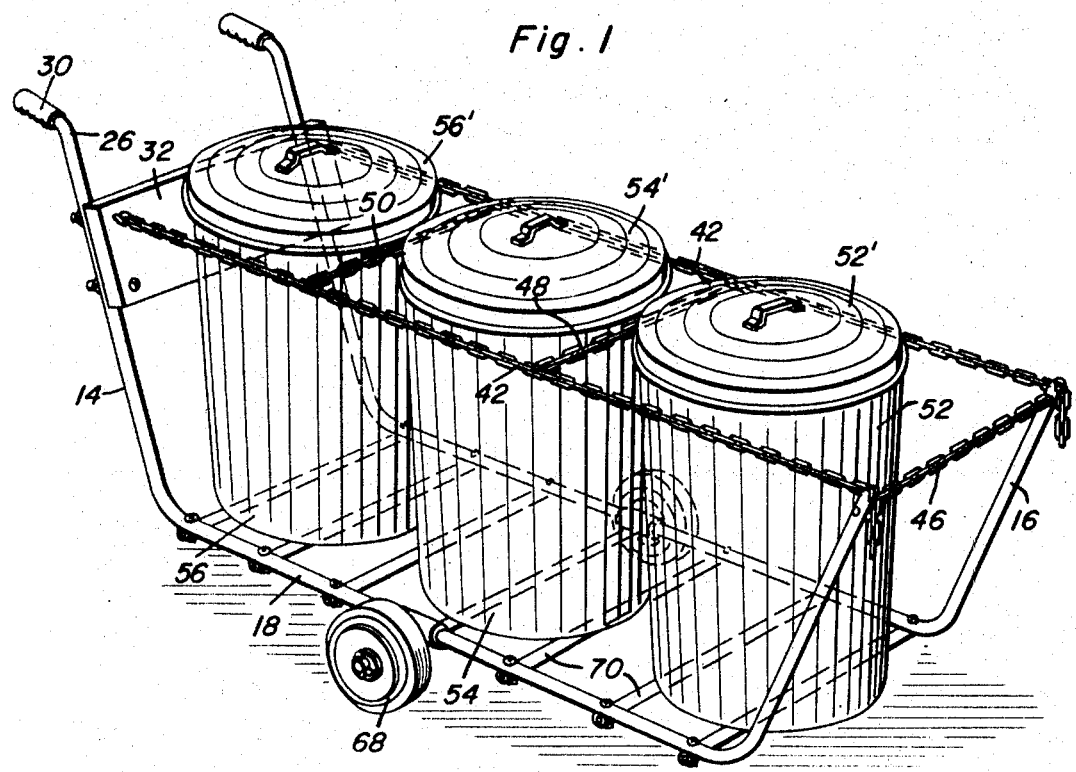
FIGURE 1 is a perspective view of the cart shown supporting a plurality of garbage or trash cans therefrom.

Referring now more specifically to the drawings, the numeral 10 generally designates the cart of the instant invention. The cart 10 includes a pair of laterally spaced and generally parallel identically formed upwardly opening U-shaped side members generally referred to by the reference numeral 12. Each of the side members 12 includes a pair of upwardly divergent arm portions or uprights 14 and 16 spaced longitudinally of the cart 10. The lower ends of each pair of corresponding arm portions 14 and 16 are interconnected by means of a bight portion 18 extending longitudinally of the cart 10. Each set of arm portions 14 and 16 and the corresponding bight portion 18 are formed of a single continuous tubular section 20 smoothly bent as at 22 and 24. Further, each section 20 is also smoothly bent as at 26 at the upper end of the corresponding arm portion 14 to form a rearwardly directed portion 28 upon which a handgrip 30 is telescopically engaged.

The upper end portions of the arm portions 14 are interconnected by means of a rigid panel 32 extending therebetween and secured to the arm portions 14 by means of suitable fasteners 34 and 36 at each end of the panel 32. The fasteners 34 and 36 extend through the panel 32 and also the corresponding upright 14. In addition, the ends of the fasteners adjacent the upright 16 define eye portions 38 to which corresponding end links 40 of a pair of link chain sections 42 are secured. The other end portions of the link chain sections 42 have selected links 40 thereof cradled in upwardly opening and longitudinally extending slots 44 formed in the upper terminal ends of the upright 16.

A first transverse link chain section 46 is secured between the upper end portion of the uprights 16 and second and third link chain sections 48 and 50 are secured between corresponding portions of the sections 42 at points spaced longitudinally therealong intermediate the panel 32 and the link chain section 46.

The panel 32 and the link chain sections 46, 48 and 50 thereby divide the area of the cart 10 disposed above the bight portions 18 into three separate areas which receive the upper ends of three trash or garbage cans 52, 54 and 56 which may be provided with suitable removable lids 52', 54' and 56', respectively.

The bight portions 18, although each defining a single tubing section, are each constructed of a pair of end aligned tubing elements 58 and 60 which carry the corresponding uprights 14 and 16, respectively at their remote ends. The adjacent ends of the tubing elements 58 and 60 are oppositely externally threaded and joined by means of a connecting sleeve 62 whose opposite ends are oppositely internally threaded. The sleeves 62 are suitably secured, as by welding 64, to the opposite end portion of a solid axle 66 upon whose opposite ends a pair of ground engaging wheels 68 are journalled, the later being disposed outwardly of the bight portions 18. Further, the front and rear pairs of tubular elements 58 and 60 are interconnected by means of generally parallel transverse tubular brace members 70 secured thereto and extending therebetween. The brace members 70 are secured to the corresponding tubular elements 58 and 60 by means of suitable removable fasteners 72.

Inasmuch as the transverse brace members 70 are removable and the bight portions 18 each include tubular elements 58 and 60 which are separable from the sleeves 62 joining the adjacent ends thereof, the cart 10 may be readily disassembled for storage in a compact stage or readily assembled from a knockdown shipping state.

Figure 5:
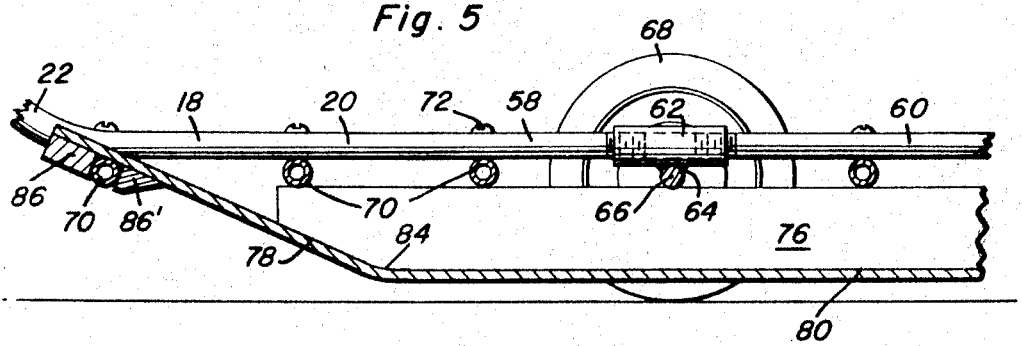
FIGURE 5 is an enlarged fragmentary longitudinal vertical sectional view of the cart taken substantially upon a plane passing through the center of the lower rear portion of the cart illustrated in FIGURE 2.
Figure 2:
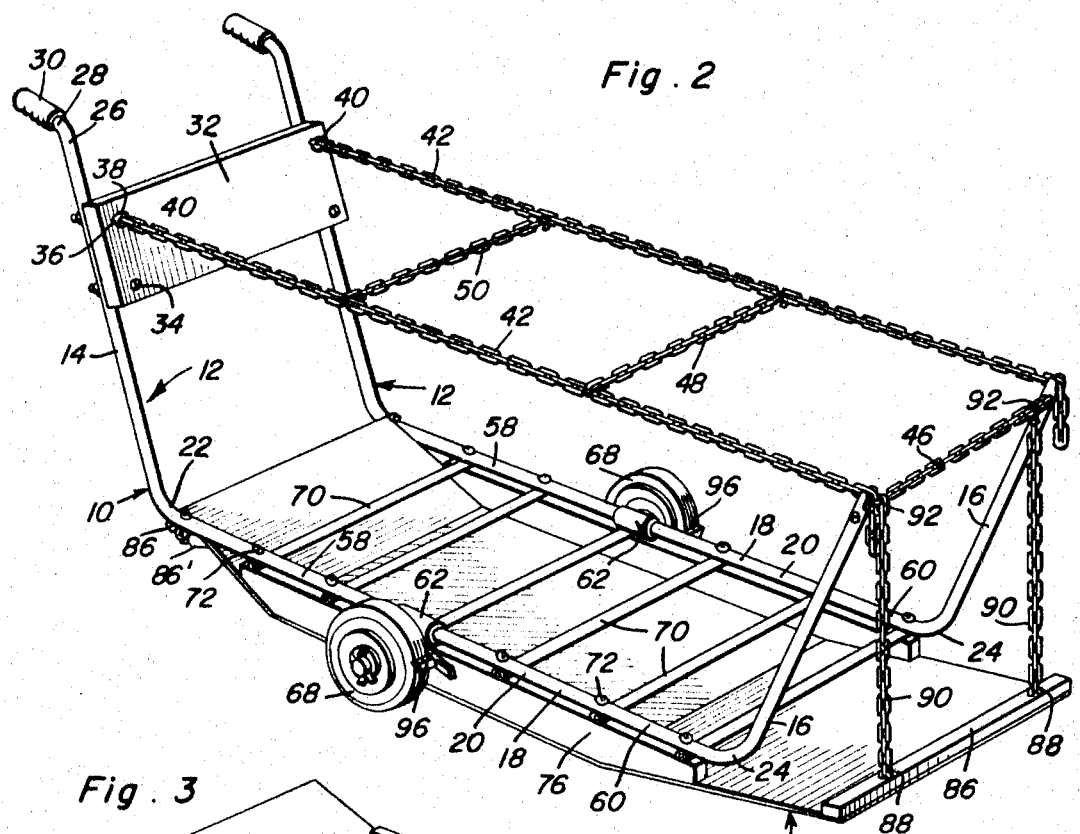
FIGURE 2 is a perspective view similar to FIGURE 1 but with the trash cans removed and the snow ski attachment of the cart operatively supported from the latter.
Figure 3:
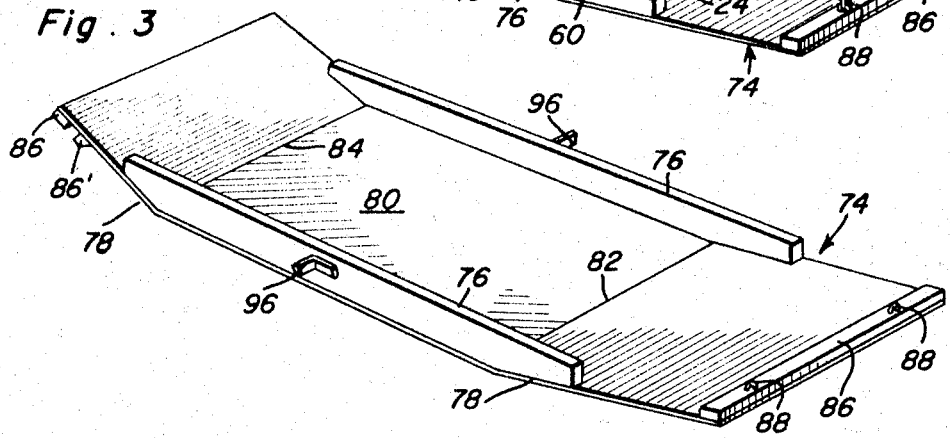
FIGURE 3 is a perspective view of the snow ski attachment of the cart.
Figure 4:
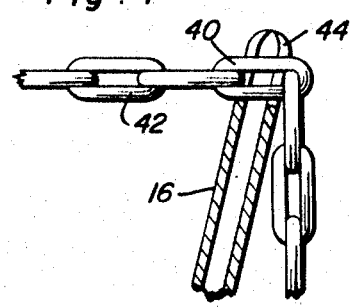
FIGURE 4 is a fragmentary enlarged vertical sectional view taken substantially upon a plane passing through one of the front upright portions of the cart.

With reference now more specifically to FIGURES 2 and 3 of the drawings there may be seen a snow ski attachment referred to in general by the reference numeral 74 including a pair of longitudinally extending, and generally parallel opposite side members 76 whose undersurface portions are beveled at their opposite ends as at 78. A generally panel-like member 80 is removably secured to the undersurface portion of the opposite side members 76 in any convenient manner and is bent slightly as at 82 and 84 so as to conform to the beveled undersurface portions 78. The panel member 80 extends beyond the opposite ends of the opposite side members 76 and is constructed of relatively stiff material. The end marginal edge portions of the panel 80 are reinforced by means of elongated transverse reinforcing members 86 which are secured to the upper surface of the forward end edge portion of the panel 80 and the undersurface of the rear end edge portion of the panel 80. The forward transverse member 86 is provided with a pair of opposite end eyes 88 to which the lower end portions of a pair of link chain sections 90 are secured and the upper end portions of the link chain sections 90 are provided with suitable hooks 92 removably engageable with the opposite end portions of the link chain section 46 as illustrated in FIGURE 2 of the drawings. However, in order to install the snow ski attachment 74 beneath the cart 10, the cart 10 may be rocked by pushing downwardly on the handgrips 30 so as raise the forward end of the cart 10 and lower the curved portions 22 into contact with the ground. After the cart has thus been rocked, the rear end portion of the snow ski attachment 74 may be placed over the rearmost transverse brace member 70 in the manner illustrated in FIGURE 5 of the drawing so that the rear transverse brace 86 hooks over and behind the rear transverse brace member 70. Then, the cart 10 may be allowed to rock back toward its horizontally disposed position bringing the undersurface portions of the opposite ends of the transverse brace member 70 and the axle 66 into contact with the upper surface portion of the opposite side members 76. Thereafter, the free ends of the link chain sections 90 having the hooks 92 supported therefrom may be hooked over the opposite end portions of the link chain sections 46 in a tensioned state. With the snow ski attachment 74 thus atached to the cart 10, the snow ski atachment 74 projects below and underlies all portions of the cart 10 except for the extreme lower peripheral portions of the ground engaging wheels 68. Of course, with the snow ski attachment 74 mounted on the cart 10, the latter may be readily pushed over a snow covered ground surface.

Although the link chain sections 42, 46, 48 and 50 are illustrated and described as defining three longitudinally spaced areas in which to receive the upper end portions of the cans 52, 54 and 56, any suitable number of longitudinally spaced areas may be defined by the addition of further transversely extending link chain sections supported from the link chain sections 42, depending upon the diameter of the cans to be supported from the cart 10. Of course, the engagement of the transverse member 86 behind the rearmost member 70 insures that the atachment 74 will not shift forwardly relative to the cart 10 and the attachment 74 includes a further transverse member 86' disposed forward of the rearmost member 70 to prevent shifting of the attachment 74 rearwardly relative to the cart 10. Further, the attachment 10 includes angle members 96 disposed forward of the forward peripheral portions of the wheels 68 which prevent snow packing on the wheels 68.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A garbage can cart including an elongated frame, said frame being defined by a pair of opposite side upwardly opening generally U-shaped side members each including a pair of upwardly directed leg portions carried by the opposite ends of a corresponding horizontal and generally straight bight portion extending longitudinally of said frame, said bight portions being connected by means of a plurality of transversely extending horizontal and generally straight brace members extending therebetween and removably secured thereto, the upper ends of said leg portions at one end of said cart including means defining handle means, said cart further including opposite side ground engaging wheels removably journaled for rotation about transverse area extending transversely of said frame centrally intermediate the opposite ends of said bight portions, said bight portions each including opposite end sections removably joined together at their adjacent ends, said bight portions and said brace members define a horizontally disposed center portion of said frame, a snow ski attachment comprising an elongated generally horizontal panel member including at least slightly upwardly directed opposite end panel portions, said frame and said attachment including coacting means removably securing said attachment beneath said center portion with the lower peripheral portions of said wheels projecting only slightly below the under surfaces of said attachment and said attachment extending substantially entirely between said wheels.

2. The combination of claim 1 including a pair of elongated opposite side longitudinal tension members each extending between and secured to the upper ends of the leg portions of the corresponding side members of said frame and a plurality of transverse tension members secured between corresponding longitudinally spaced portions of said longitudinal tension members.

3. The combination of claim 2 including a rigid brace member secured between the upper ends of the leg portions at one end of said cart.

4. A garbage can cart including an elongated frame having a generally horizontal center portion adapted to removably support a plurality of trash or garbage cans, said grame including opposite side ground engaging wheel means journaled for rotation about transverse axes and disposed intermediate the opposite ends of said center portion, a snow ski attachment including an elongated generally horizontal panel member including at least slightly upwardly directed opposite end portions, said frame and said attachment including coacting means removably securing said attachment beneath said center portion with the lower peripheral portions of said wheels projecting only slightly below the under surfaces of said attachment, one end of said snow ski attachment projects outwardly beyond one end of said center portion, said one end of said attachment having the lower ends of a pair of upstanding tension members secured thereto, the upper ends of said upstanding tension members secured to elevated portions of said frame disposed outwardly of said one end of said center portion of said frame .

5. The combination of claim 4 wherein said frame being defined by a pair of opposite side upwardly opening generally U-shaped side members each including a pair of upwardly directed leg portions carried by the opposite ends of a corresponding bight portion extending longitudinally of said frame, said bight portions being connected by means of a plurality of transversely extending brace members extending therebetween and removably secured thereto, the upper ends of said leg portions at one end of said cart including means defining handle means, said bight portions each including opposite end sections removably joined together at their adjacent ends.

6. The combination of claim 5 including a pair of elongated opposite side longitudinal tension members each extending between and secured to the upper ends of the leg portions of the corresponding side member of said frame and a plurality of transverse tension members secured between corresponding longitudinally spaced portions of said longitudinal tension members.

7. The combination of claim 6 including a rigid brace member secured between the upper ends of the leg portions at one end of said cart.

References Cited

UNITED STATES PATENTS

| | | | |
|---|---|---|---|
| 334,925 | 1/1886 | Babcock | 280—8 |
| 682,941 | 9/1901 | Kohnen | 280—8 |
| 1,176,978 | 3/1916 | Parker | 280—47.35 |
| 1,701,212 | 2/1929 | Nickerson | 280—8 |
| 2,504,907 | 4/1950 | Truran | 280—47.19 X |
| 3,111,333 | 11/1963 | Marini et al. | 280—47.19 |

BENJAMIN HERSH, Primary Examiner

JOEL E. SIEGEL, Assistant Examiner

U.S. Cl. X.R.

280—47.19